United States Patent
Kaise

(10) Patent No.: US 7,024,208 B2
(45) Date of Patent: Apr. 4, 2006

(54) RADIO COMMUNICATION SERVICE PROVIDING SYSTEM, RADIO COMMUNICATION DEVICE, RADIO COMMUNICATION SERVICE PROVIDING METHOD, AND RADIO COMMUNICATION METHOD

(75) Inventor: Kunitake Kaise, Nerima-ku (JP)

(73) Assignee: Helios Co., Ltd., Takatsuki (JP)

( * ) Notice: Subject to any disclaimer, the term of this patent is extended or adjusted under 35 U.S.C. 154(b) by 336 days.

(21) Appl. No.: 10/362,968

(22) PCT Filed: Sep. 5, 2001

(86) PCT No.: PCT/JP01/07677
§ 371 (c)(1),
(2), (4) Date: Mar. 5, 2003

(87) PCT Pub. No.: WO02/21813
PCT Pub. Date: Mar. 14, 2002

(65) Prior Publication Data
US 2004/0198390 A1    Oct. 7, 2004

(30) Foreign Application Priority Data

Sep. 5, 2000  (JP) .............................. 2000-269407
Sep. 3, 2001  (JP) .............................. 2001-265158

(51) Int. Cl.
H04Q 7/20      (2006.01)

(52) U.S. Cl. ................ 455/456.3; 455/456.1; 455/414.2; 455/414.3; 455/456.6; 455/466; 455/412.2

(58) Field of Classification Search ............ 455/456.3, 455/456.6, 466, 414.2–3, 412.2; 705/14; 709/231
See application file for complete search history.

(56) References Cited

U.S. PATENT DOCUMENTS 6,208,866 B1 * 3/2001 Rouhollahzadeh et al. 455/456.5
(Continued)

FOREIGN PATENT DOCUMENTS

JP    2002-73949    3/2002

OTHER PUBLICATIONS

Patent Abstracts of Japan, Publn. No. 11-065434 of Mar. 5, 1999. See Int'l. Search Rpt.
Patent Abstracts of Japan, Publn. No. 2000-224658 of Aug. 11, 2000. See Int'l. Search Rpt.
(Continued)

*Primary Examiner*—William Trost
*Assistant Examiner*—Sharad Rampuria
(74) *Attorney, Agent, or Firm*—Armstrong, Kratz, Quintos, Hanson & Brooks, LLP

(57) ABSTRACT

The advertising information management server (4A) acquires the advertising information and the destination address information which should be delivered from the advertisement offer terminal (5A) to the portable terminal (1A) via the communication network (7A). The advertising information management server (4A) has information on all user's personal information of the portable terminal (1A) and the advertiser by the data base, and retrieves the user of the portable terminal (1A) who satisfies the condition specified from the advertisement offer terminal (5A) by using it. Especially, the advertising information management server (4A) acquires positional information from the portable terminal (1A) which has the positional detection function or measures the position of the portable terminal (1A) by using the base station (2A), and transmits the advertising information to the portable terminal (1A) in the region that the advertisement offer terminal (5A) specified.

Moreover, This wireless communication service offer system informs two or more radio communication equipment of the destination address condition with a paging channel of the base station where the advertising information management server takes charge of the delivery concerned area according to the condition (especially, delivery area) in destination address specified from the advertiser, and if it meets the reception requirement, the radio communication equipment acquires advertising information that the advertising information management server offers with a traffic channel or a paging channel. And, even if it meets the reception requirement again when the advertising information is acquired, the radio communication equipment does not acquire same advertising information.

58 Claims, 5 Drawing Sheets

U.S. PATENT DOCUMENTS

| | | | | |
|---|---|---|---|---|
| 6,351,647 B1 * | 2/2002 | Gustafsson | | 455/466 |
| 6,381,465 B1 * | 4/2002 | Chern et al. | | 455/466 |
| 6,470,181 B1 * | 10/2002 | Maxwell | | 455/413 |
| 6,526,275 B1 * | 2/2003 | Calvert | | 455/418 |
| 6,546,257 B1 * | 4/2003 | Stewart | | 455/456.3 |
| 6,560,456 B1 * | 5/2003 | Lohtia et al. | | 455/445 |
| 6,636,733 B1 * | 10/2003 | Helferich | | 455/412.2 |
| 6,647,257 B1 * | 11/2003 | Owensby | | 455/414.1 |
| 6,647,269 B1 * | 11/2003 | Hendrey et al. | | 455/456.3 |
| 6,754,485 B1 * | 6/2004 | Obradovich et al. | | 455/414.1 |
| 6,829,475 B1 * | 12/2004 | Lee et al. | | 455/419 |
| 6,839,556 B1 * | 1/2005 | Malackowski et al. | | 455/414.3 |
| 2001/0037240 A1 * | 11/2001 | Marks et al. | | 705/14 |
| 2003/0065805 A1 * | 4/2003 | Barnes | | 709/231 |

OTHER PUBLICATIONS

Patent Abstracts of Japan, Publn. No. 2001-094518 of Apr. 6, 2001. See Int'l. Search Rpt.

Patent Abstracts of Japan, Publn. No. 09-114755 of May 2, 1997. See Int'l. Search Rpt.

Patent Abstracts of Japan, Publn. No. 10-290443 of Oct. 27, 1998. See Int'l. Search Rpt.

Patent Abstracts of Japan, Publn. No. 11-068987 of Mar. 9, 1999. See Int'l. Search Rpt.

Patent Abstracts of Japan, Publn. No. 10-327472 of Dec. 8, 1998. See Int'l. Search Rpt.

Patent Abstracts of Japan, Publn. No. 2000-148617 of May 30, 2000. See Int'l. Search Rpt.

Patent Abstracts of Japan, Publn. No. 2000-078183 of Mar. 14, 2000. See Int'l. Search Rpt.

* cited by examiner

Advertising Information Entry Homepage

Advertiser ID : _____
Password : _____

(B)

Advertising Information Entry Homepage advertising message     delivery condition

| advertising messaging new input | delivery condition input |
|---|---|
| advertising messaging selection | delivery condition selection |

| TX | Modify | Cancel | EXIT |

Fig. 4

| No. | E-mail reception list | | | Read/ |
|---|---|---|---|---|
| | Other Party/Kind | Date | Time | Unread |
| 01 | Advertisement | Sep. 4, '00 | 10:00 | Unread |
| 02 | Advertisement | Sep. 2, '00 | 14:00 | Read |
| 03 | 09012345678 | Sep. 2, '00 | 9:00 | Unread |
| 04 | Advertisement | Sep. 2, '00 | 8:00 | Read |
| 05 | Hanako YAMADA | Sep. 1, '00 | 23:00 | Read |
| 06 | hanako@abc.co.jp | Sep. 1, '00 | 22:30 | Read |
| 07 | Advertisement | Sep. 1, '00 | 11:25 | Unread |

Advertising Mail

Advertiser : ABC fish shop

Today, fresh saury of Sanriku-oki is on largeness markets ! 300 yen for five ! Seeing the advertisement, 50 yen is further discounted.

| MENU | OK | MAP |

| Advertising Transmission Result Report | | |
|---|---|---|
| Destination: housewife | Date: Sep. 4, 2000 | |
| | Total | Read |
| (1) 20~29 | 535 | 328 |
| (2) 30~39 | 359 | 274 |
| (3) 40~49 | 106 | 28 |

Advertising Message :

Today, fresh saury of Sanriku-oki is on largeness markets ! 300 yen for five ! Seeing the advertisement, 50 yen is further discounted

RADIO COMMUNICATION SERVICE PROVIDING SYSTEM, RADIO COMMUNICATION DEVICE, RADIO COMMUNICATION SERVICE PROVIDING METHOD, AND RADIO COMMUNICATION METHOD

TECHNICAL FIELD

The present invention relates to RADIO COMMUNICATION SERVICE PROVIDING SYSTEM, RADIO COMMUNICATION DEVICE, RADIO COMMUNICATION SERVICE PROVIDING METHOD, AND RADIO COMMUNICATION METHOD. Still in detail, a user of the RADIO COMMUNICATION DEVICE pays a predetermined charge by receiving a radio communications service from a telecommunication carrier via a radio communications network, and a telephone call of RADIO COMMUNICATION DEVICE is possible by transmitting and receiving a voice signal using a traffic channel if RADIO COMMUNICATION DEVICE makes telephone call connection with a base station according to a predetermined call connection procedure, when the control channel which was specified from the base station of the radio communications network is supervised in a waiting mode and the self identification number is the same as a broadcasted call number. RADIO COMMUNICATION SERVICE PROVIDING SYSTEM, RADIO COMMUNICATION SERVICE PROVIDING METHOD, AND RADIO COMMUNICATION METHOD are including the RADIO COMMUNICATION DEVICE.

Moreover, this invention relates to INFORMATION RECORDED MEDIUM recorded the program which performs those procedure to semiconductor memory, LD (laser disc), HD (hard disk), FD (flexible disk), MD (mini disc), CD (compact disk) or DVD (digital videodisc).

BACKGROUND ART

In recent years, the spread of a radio communication device represented by a Personal Digital Assistant and a portable telephone is remarkable. Especially, with the phonecall charges of a portable telephone, or the fall of a main part price, a portable telephone is becoming the time when one person has one set and already serves as an indispensable item among young men.

In addition to a telephone call function which is a basic function, each telecommunication carrier is competing and commercializing those radio communication device which have a character transceiver function, E-mail function which transmits and receives text data and various files, and Internet connectivity function represented by I-Mode of NTT DoCoMo (Registered Trademark) for a short period of time, and is aiming at the performance rise and the functional rise one after another. Still more, the conventional portable telephone are indicated by Provisional Publication No. OPH10-313338, OPH11-98248, OPH11-112554, OP2000-32142, etc. Since it is common knowledge, the detailed explanation is omitted, but it cannot be overemphasized that invention indicated by these can be used for this invention.

By the way, although the talk changes, If a major company retailer such as a volume retailer of an electrical machinery productor or a department store, a middle-scale retailer such as a supermarket which sells the miscellaneous-goods article for days, and an individual retailer such as a greengrocery and a fruit shop, have little advertising expense when placing an advertisement of a bargain sale or a discount sale, they will put an insertion flier into a daily newspaper, and will advertize by delivering directly to a newspaper buyer's house. On the other hand, If advertising expense is enough, they will distribute the advertisement to a televiewer in the form of commercials using the mass media, such as TV or radio.

However, although an inserted advertisement or commercials reach a home by the conventional method of advertisement or propaganda, it is unknown whether advertising information got across to the target consumer correctly. For example, considering the case where the fish dealer of a town distributes an inserted advertisement to a neighboring resident, and a large bargain sale is carried out from 10:00 a.m. to 5:00 p.m., if a housewife layer looks at an inserted advertisement and she comes to a store in the time zone, an advertisement will be a success. But, although the solo salaried worker who lives in the area may be see the advertisement, since they are working in the time zone in their company and are in the distant place from a fish dealer, it is physically difficult to purchase large bargain sale goods. And an advertisement will become almost meaningless. Moreover, the commercials using the mass media can also say the same thing. For example, it becomes often useless to pass the commercials for a salaried worker as a target on a salaried worker's office hours belt.

This invention is made in order to solve the above-described problem, and the purpose of this invention are to provide RADIO COMMUNICATION SERVICE PROVIDING SYSTEM, RADIO COMMUNICATION DEVICE, RADIO COMMUNICATION SERVICE PROVIDING METHOD and RADIO COMMUNICATION METHOD wherein exact advertising information can be distributed to the targeted owner of a radio communication device timely, and the user who received advertising distribution can receive discount of a use charge (for example, discount of the purchase price of goods or the use charge of an institution etc.), and INFORMATION RECORDED MEDIUM recorded the program which performs those procedure of the method.

In addition, as conventional technology which advertises by the cellular-phone system, although there are Provisional Publication No. OPH11-3072 and OPH11-252645 etc., they differ from RADIO COMMUNICATION SERVICE PROVIDING SYSTEM etc. concerning this invention. And there are Provisional Publication No. OPH11-065434, OPH11-068987, OPH09-114755, OPH10-290443, OP2000-224658, OPH10-327472, OP2000-148617 and OP2000-2078183 which were quoted in the examination stage of the Japanese patent application No. 2000-269407 which is a priority application submitted by this applicant previously, they differ from RADIO COMMUNICATION SERVICE PROVIDING SYSTEM etc. concerning this invention, because the priority application is expected to be patented.

DISCLOSURE OF THE INVENTION

In order to achieve the stated purpose, the present invention of claim 1 is that a radio communication service providing system in which a user of a radio communication device pays a predetermined charge by receiving a radio communications service from a telecommunication carrier via a radio communications network, the system comprising: a position measurement means for measuring the present position of said radio communication device; and an advertising information management server for receiving advertising information to be distributed and distribution place information, and for transmitting said advertising information to said radio communication device; wherein said advertising information management server transmits said advertising information to said radio communication device which is present in a designated place region based on the present position of said radio communication device measured by said position measurement means and position information included in said distribution place information, and said radio communication device receives said advertising information transmitted by said advertising information management server, however, said advertising information management server does not transmit the same advertising information to said radio communication device, even if said radio communication device once comes out and returns within said designated place again.

The present invention of claim 2 is that a radio communication service providing system according to claim 1, in which said advertising information management server transmits said advertising information to a radio communication device up to the number of distribution contained in said distribution place information.

The present invention of claim 3 is that a radio communication service providing system according to claims 1 or 2, in which said advertising information management server eliminates said advertising information from a database, if the inputted distribution term of said advertising information passes.

The present invention of claim 4 is that a radio communication service providing system as in one of claims 1–3, in which said position measurement means measures the present position of said radio communication device by the position detection function of GPS which said radio communication device possesses.

The present invention of claim 5 is that a radio communication service providing system according to claim 4, in which said advertising information management server makes said radio communication device transmit the position information of said radio communication device periodically or whenever required which said GPS measured.

The present invention of claim 6 is that a radio communication service providing system as in one of claims 1–3, in which said position measurement means measures the present position of said radio communication device by using the base station which transmits and receives the required signals with said radio communication device and carries out a position registration.

The present invention of claim 7 is that a radio communication service providing system according to claim 6, in which said position measurement means measures the present position of said radio communication device by measuring the electric wave from said radio communication device using plurality of said base station and calculating the distance from each base station.

The present invention of claim 8 is that a radio communication service providing system as in one of claims 1–7, in which said radio communication device returns an advertising file ID of said advertising information which was distributed to said advertising information management server.

The present invention of claim 9 is that a radio communication service providing system according to claim 8, in which said radio communication device returns said advertising file ID of said advertising information to said advertising information management server when said radio communication device opens said advertising information.

The present invention of claim 10 is that a radio communication service providing system as in one of claims 1–7, in which said radio communication device returns said advertising file ID and device ID to said advertising information management server.

The present invention of claim 11 is that a radio communication service providing system according to claim 10, in which said radio communication device returns said advertising file ID and device ID to said advertising information management server when said radio communication device opens said advertising information.

The present invention of claim 12 is that a radio communication service providing system as in one of claims 1–7, in which said radio communication device transmits read information which means said advertising information was already read to said advertising information management server, if the key corresponding to O.K. button is pushed in the state where a display block shows the details of said advertising information and O.K. button.

The present invention of claim 13 is that a radio communication service providing system as in one of claims 1–7, in which said radio communication device transmits map data request information with read information which means said advertising information was already read to said advertising information management server, if the key corresponding to MAP button is pushed in the state where a display block shows the details of said advertising information and MAP button.

The present invention of claim 14 is that a radio communication service providing system according to claim 13, in which said advertising information management server accesses a map database and transmits map data processed to display the present position of said radio communication device and an advertiser's store most greatly, if said advertising information management server received said map data request information.

The present invention of claim 15 is that a radio communication service providing system as in one of claims 1–7, in which said radio communication device transmits read information which means said advertising information was already read to said advertising information management server, if said advertising information is displayed on a display block.

The present invention of claim 16 is that a radio communication service providing system as in one of claims 12–15, in which said advertising information management server stands a read flag to an advertising ID item corresponding to said advertising information, if said read information is received.

The present invention of claim 17 is that a radio communication service providing system according to claim 16, in which said advertising information management server does not stand a read flag to an advertising ID item corresponding to said advertising information, when said advertising information is already finished, even if said read information is received.

The present invention of claim 18 is that a radio communication service providing system according to claims 16 or 17, a use charge of said radio communication device is discounted by the number of said read flag.

The present invention of claim 19 is that a radio communication service providing system as in one of claims 16–18, in which said advertising information management server does not transmit the same advertising information to said radio communication device, even if said radio communication device once comes out and returns within said designated place again by a transmitted flag stood to an advertising ID item corresponding to said advertising information, when said advertising information is transmitted to said radio communication device.

The present invention of claim 20 is that a radio communication service providing system according to claim 19, in which said advertising information management server arranges the distribution place of an advertisement and read or not-read information, and transmits to an advertisement offer terminal based on said transmitted flag and said read flag.

The present invention of claim 21 is that a radio communication service providing system as in one of claims 1–20, in which said radio communication device eliminates said advertising information from an E-mail reception list by the time information for automatic elimination added to received said advertising information.

The present invention of claim 22 is that a radio communication service providing system as in one of claims 1–21, further comprising an electronic commerce main frame for a bank or a credit company to use electronic commerce; said electronic commerce main frame collects the money, which is deducted the amount of discount of the goods of advertising information displayed on said radio communication device from the purchase amount of money, from the bank account of said radio communication device's user.

The present invention of claim 23 is that a radio communication service providing system according to claim 22, in which said electronic commerce main frame collects the money, which is deducted the amount of discount of the goods of advertising information displayed on said radio communication device from the purchase amount of money based on the identification number of the goods, the amount of discount transmitted by said advertising information management server, the number of a money card or a debit card used by electronic commerce, and purchase price information transmitted by a register management server via the communication network, from the bank account of said radio communication device's user.

The present invention of claim 24 is that a radio communication service providing system as in one of claims 1–23, further comprising a register for a store or a supermarket to use for liquidation of a purchase price; said register publishes a receipt deducted the amount of discount of the goods of advertising information displayed on said radio communication device from the purchase amount of money.

The present invention of claim 25 is that a radio communication service providing system according to claim 24, in which said register publishes a receipt deducted the amount of discount of the goods of advertising information displayed on said radio communication device from the purchase amount of money based on the collected information via a communication network when said electronic commerce main frame has collected the money deducted the amount of discount from the bank account.

The present invention of claim 26 is that a radio communication service providing method used in a radio communication service providing system in which a user of a radio communication device pays a predetermined charge by receiving a radio communications service from a telecommunication carrier via a radio communications network, and having a position measurement means for measuring the present position of said radio communication device and an advertising information management server for receiving advertising information to be distributed and distribution place information, and for transmitting said advertising information to said radio communication device, the method comprising the steps of: said advertising information management server transmitting said advertising information to said radio communication device which is present in a designated place region based on the present position of said radio communication device measured by said position measurement means and position information included in said distribution place information; said radio communication device receiving said advertising information transmitted by said advertising information management server; and said advertising information management server not transmitting the same advertising information to said radio communication device, even if said radio communication device once comes out and returns within said designated place again.

The present invention of claim 27 is that a radio communication service providing method according to claim 26, in which said transmitting step transmits said advertising information to a radio communication device up to the number of distribution contained in said distribution place information.

The present invention of claim 28 is that a radio communication service providing method according to claims 26 or 27, further comprising; a step of said advertising information management server eliminating said advertising information from a database, if the inputted distribution term of said advertising information passes.

The present invention of claim 29 is that a radio communication service providing method as in one of claims 26–28, further comprising; a step of said position measurement means measuring the present position of said radio communication device by the position detection function of GPS which said radio communication device possesses.

The present invention of claim 30 is that a radio communication service providing method according to claim 29, further comprising; a step of said advertising information management server making said radio communication device transmit the position information of said radio communication device periodically or whenever required which said GPS measured.

The present invention of claim 31 is that a radio communication service providing method as in one of claims 26–28, further comprising; a step of said position measurement means measuring the present position of said radio communication device by using the base station which transmits and receives the required signals with said radio communication device and carries out a position registration.

The present invention of claim 32 is that a radio communication service providing method according to claim 31, further comprising; a step of said position measurement means measuring the present position of said radio communication device by measuring the electric wave from said radio communication device using plurality of said base station and calculating the distance from each base station.

The present invention of claim 33 is that a radio communication service providing method as in one of claims 26–32, further comprising; a step of said radio communication device returning an advertising file ID of said advertising information which was distributed to said advertising information management server.

The present invention of claim 34 is that a radio communication service providing method according to claim 33, further comprising; a step of said radio communication device returning said advertising file ID of said advertising information to said advertising information management server when said radio communication device opens said advertising information.

The present invention of claim 35 is that a radio communication service providing method as in one of claims 26–32, further comprising; a step of said radio communication device returning said advertising file ID and device ID to said advertising information management server.

The present invention of claim 36 is that a radio communication service providing method according to claim 35, further comprising; a step of said radio communication device returning said advertising file ID and device ID to said advertising information management server when said radio communication device opens said advertising information.

The present invention of claim 37 is that a radio communication service providing method as in one of claims 26–32, further comprising; a step of said radio communication device transmitting read information which means said advertising information was already read to said advertising information management server, if the key corresponding to O.K. button is pushed in the state where a display block shows the details of said advertising information and O.K. button.

The present invention of claim 38 is that a radio communication service providing method as in one of claims 26–32, further comprising; a step of said radio communication device transmitting map data request information with read information which means said advertising information was already read to said advertising information management server, if the key corresponding to MAP button is pushed in the state where a display block shows the details of said advertising information and MAP button.

The present invention of claim 39 is that a radio communication service providing method according to claim 38, further comprising; a step of said advertising information management server accessing a map database and transmitting map data processed to display the present position of said radio communication device and an advertiser's store most greatly, if said advertising information management server received said map data request information.

The present invention of claim 40 is that a radio communication service providing method as in one of claims 26–32, further comprising; a step of said radio communication device transmitting read information which means said advertising information was already read to said advertising information management server, if said advertising information is displayed on a display block.

The present invention of claim 41 is that a radio communication service providing method as in one of claims 37–40, further comprising; a step of said advertising information management server standing a read flag to an advertising ID item corresponding to said advertising information, if said read information is received.

The present invention of claim 42 is that a radio communication service providing method according to claim 41, further comprising; a step of said advertising information management server not standing a read flag to an advertising ID item corresponding to said advertising information, when said advertising information is already finished, even if said read information is received.

The present invention of claim 43 is that a radio communication service providing method according to claim 41 or 42, further comprising; a step of a use charge of said radio communication device being discounted by the number of said read flag.

The present invention of claim 44 is that a radio communication service providing method as in one of claims 41–43, further comprising; a step of said advertising information management server not transmitting the same advertising information to said radio communication device, even if said radio communication device once comes out and returns within said designated place again by a transmitted flag stood to an advertising ID item corresponding to said advertising information, when said advertising information is transmitted to said radio communication device.

The present invention of claim 45 is that a radio communication service providing method according to claim 44, further comprising; a step of said advertising information management server arranging the distribution place of an advertisement and read or not-read information, and transmitting to an advertisement offer terminal based on said transmitted flag and said read flag.

The present invention of claim 46 is that a radio communication service providing method as in one of claims 26–45, further comprising; a step of said radio communication device eliminating said advertising information from an E-mail reception list by the time information for automatic elimination added to received said advertising information.

The present invention of claim 47 is that a radio communication service providing method as in one of claims 26–46, the system further having an electronic commerce main frame for a bank or a credit company to use electronic commerce, and the method further comprising; a step of said electronic commerce main frame collecting the money, which is deducted the amount of discount of the goods of advertising information displayed on said radio communication device from the purchase amount of money, from the bank account of said radio communication device's user.

The present invention of claim 48 is that a radio communication service providing method according to claim 47, the step of collecting collects the money, which is deducted the amount of discount of the goods of advertising information displayed on said radio communication device from the purchase amount of money based on the identification number of the goods, the amount of discount transmitted by said advertising information management server, the number of a money card or a debit card used by electronic commerce, and purchase price information transmitted by a register management server via the communication network, from the bank account of said radio communication device's user.

The present invention of claim 49 is that a radio communication service providing method as in one of claims 26–48, the system further having a register for a store or a supermarket to use for liquidation of a purchase price, and the method further comprising; a step of said register publishing a receipt deducted the amount of discount of the goods of advertising information displayed on said radio communication device from the purchase amount of money.

The present invention of claim 50 is that a radio communication service providing method according to claim 49, the step of publishing publishes a receipt deducted the amount of discount of the goods of advertising information displayed on said radio communication device from the purchase amount of money based on the collected information via a communication network when said electronic commerce main frame has collected the money deducted the amount of discount from the bank account.

The present invention of claim 63 is that a radio communication service providing system in which a user pays a predetermined charge by receiving a radio communications service from a telecommunication carrier via a radio communications network, the system comprising: a radio communication device which supervises a control channel specified by a base station of said radio communications network in a waiting mode, and becomes possible to communicate by connecting with said base station for a telephone call according to a predetermined connection procedure when a broadcasted call number and a self ID number are in the same, and by transmitting and receiving a voice signal using a traffic channel; a position measurement means for measuring the present position of said radio communication device; and an advertising information management server for broadcasting distribution place information of advertising information to be distributed to said radio communication device using a broadcast channel of said base station; wherein said radio communication device further comprising, a distribution place information acquisition means for acquiring said distribution place information broadcasted on said broadcast channel in a waiting mode; a judgment means for judging whether located in the distribution area of advertising information based on distribution area information in said distribution place information and the present position measured by said position measurement means; a reception directions means for directing reception of said advertising information based on the judgment result of said judgment means; an advertising information acquisition means for getting an advertising information corresponding to said distribution place information provided by said advertising information management server using said control channel or said traffic channel if said reception directions means directs reception; an advertising information memory means for memorizing advertising information acquired by said advertising information acquisition means; and a display means for displaying advertising information memorized in advertising information memory means; wherein said reception directions means directs reception of said advertising information to said advertising information acquisition means when said judgment means judged the present place is in the distribution area of advertising information, however, does not direct reception to said advertising information acquisition means, even if said radio communication device once comes out and returns within said designated place again and said judgment means judged the present place is in the distribution area when the receive information of said advertising information is memorized in said advertising information memory means.

The present invention of claim 64 is that a radio communication service providing system according to claim 63, in which said radio communication device further comprising; a first information transmitting means for transmitting information showing that said advertising information is acquired, if said advertising information acquisition means acquires advertising information using said broadcast channel and mutual communication with the side of said radio communications network is performed after acquiring said advertising information.

The present invention of claim 65 is that a radio communication service providing system according to claim 63, in which said radio communication device further comprising; a second information transmitting means for transmitting information showing that said advertising information is acquired, if said display means displays advertising information and mutual communication with the side of said radio communications network is performed after acquiring said advertising information.

The present invention of claim 66 is that a radio communication service providing method used in a radio communication service providing system in which a user pays a predetermined charge by receiving a radio communications service from a telecommunication carrier via a radio communications network, and further having a radio communication device which supervises a control channel specified by a base station of said radio communications network in a waiting mode, and becomes possible to communicate by connecting with said base station for a telephone call according to a predetermined connection procedure when a broadcasted call number and a self ID number are in the same, and by transmitting and receiving a voice signal using a traffic channel, a position measurement means for measuring the present position of said radio communication device, and an advertising information management server for broadcasting distribution place information of advertising information to be distributed to said radio communication device using a broadcast channel of said base station, the method comprising the steps of: a distribution place information acquisition means acquiring said distribution place information broadcasted on said broadcast channel in a waiting mode; a judgment means judging whether located in the distribution area of advertising information based on distribution area information in said distribution place information and the present position measured by said position measurement means; a reception directions means directing reception of said advertising information based on the judgment result of said judgment means; an advertising information acquisition means getting an advertising information corresponding to said distribution place information provided by said advertising information management server using said control channel or said traffic channel if said reception directions means directs reception; an advertising information memory means memorizing advertising information acquired by said advertising information acquisition means; and a display means displaying advertising information memorized in advertising information memory means; wherein said reception directions means directs reception of said advertising information to said advertising information acquisition means when said judgment means judged the present place is in the distribution area of advertising information, however, does not direct reception to said advertising information acquisition means, even if said radio communication device once comes out and returns within said designated place again and said judgment means judged the present place is in the distribution area when the receive information of said advertising information is memorized in said advertising information memory means.

The present invention of claim 67 is that a radio communication service providing method according to claim 66, further comprising; a step of a first information transmitting means transmitting information showing that said advertising information is acquired, if said advertising information acquisition means acquires advertising information using said broadcast channel and mutual communication with the side of said radio communications network is performed after acquiring said advertising information.

The present invention of claim 68 is that a radio communication service providing method according to claim 66, further comprising; a step of a second information transmitting means transmitting information showing that said advertising information is acquired, if said display means displays advertising information and mutual communication with the side of said radio communications network is performed after acquiring said advertising information.

The present invention of claim 69 is that a radio communication device used in a radio communication service providing system where a user of a radio communication device pays a predetermined charge by receiving a radio communications service from a telecommunication carrier via a radio communications network, and the system having a position measurement means for measuring the present position of said radio communication device and an advertising information management server for broadcasting distribution place information of advertising information to be distributed to said radio communication device using a broadcast channel of said base station, and the device which supervises a control channel specified by a base station of said radio communications network in a waiting mode, and becomes possible to communicate by connecting with said base station for a telephone call according to a predetermined connection procedure when a broadcasted call number and a self ID number are in the same, and by transmitting and receiving a voice signal using a traffic channel, further comprising: a distribution place information acquisition means for acquiring said distribution place information broadcasted on said broadcast channel in a waiting mode; a judgment means for judging whether located in the distribution area of advertising information based on distribution area information in said distribution place information and the present position measured by said position measurement means; a reception directions means for directing reception of said advertising information based on the judgment result of said judgment means; an advertising information acquisition means for getting an advertising information corresponding to said distribution place information provided by said advertising information management server using said control channel or said traffic channel if said reception directions means directs reception; an advertising information memory means for memorizing advertising information acquired by said advertising information acquisition means; and a display means for displaying advertising information memorized in advertising information memory means; wherein said reception directions means directs reception of said advertising information to said advertising information acquisition means when said judgment means judged the present place is in the distribution area of advertising information, however, does not direct reception to said advertising information acquisition means, even if said radio communication device once comes out and returns within said designated place again and said judgment means judged the present place is in the distribution area when the receive information of said advertising information is memorized in said advertising information memory means.

The present invention of claim 70 is that a radio communication device according to claim 69, further comprising; a first information transmitting means for transmitting information showing that said advertising information is acquired, if said advertising information acquisition means acquires advertising information using said broadcast channel and mutual communication with the side of said radio communications network is performed after acquiring said advertising information.

The present invention of claim 71 is that a radio communication device according to claim 69, further comprising; a second information transmitting means for transmitting information showing that said advertising information is acquired, if said display means displays advertising information and mutual communication with the side of said radio communications network is performed after acquiring said advertising information.

The present invention of claim 72 is that a radio communication service providing method used in a radio communication service providing system in which a user of a radio communication device pays a predetermined charge by receiving a radio communications service from a telecommunication carrier via a radio communications network, and having a position measurement means for measuring the present position of said radio communication device and an advertising information management server for broadcasting distribution place information of advertising information to be distributed to said radio communication device using a broadcast channel of said base station, and further used in a radio communication device which supervises a control channel specified by a base station of said radio communications network in a waiting mode, and becomes possible to communicate by connecting with said base station for a telephone call according to a predetermined connection procedure when a broadcasted call number and a self ID number are in the same, and by transmitting and receiving a voice signal using a traffic channel, the method comprising the steps of: a distribution place information acquisition means acquiring said distribution place information broadcasted on said broadcast channel in a waiting mode; a judgment means judging whether located in the distribution area of advertising information based on distribution area information in said distribution place information and the present position measured by said position measurement means; a reception directions means directing reception of said advertising information based on the judgment result of said judgment means; an advertising information acquisition means getting an advertising information corresponding to said distribution place information provided by said advertising information management server using said control channel or said traffic channel if said reception directions means directs reception; an advertising information memory means memorizing advertising information acquired by said advertising information acquisition means; and a display means displaying advertising information memorized in advertising information memory means; wherein said reception directions means directs reception of said advertising information to said advertising information acquisition means when said judgment means judged the present place is in the distribution area of advertising information, however, does not direct reception to said advertising information acquisition means, even if said radio communication device once comes out and returns within said designated place again and said judgment means judged the present place is in the distribution area when the receive information of said advertising information is memorized in said advertising information memory means.

The present invention of claim 73 is that a radio communication service providing method according to claim 72, further comprising; a step of a first information transmitting means transmitting information showing that said advertising information is acquired, if said advertising information acquisition means acquires advertising information using said broadcast channel and mutual communication with the side of said radio communications network is performed after acquiring said advertising information.

The present invention of claim 74 is that a radio communication service providing method according to claim 72, further comprising; a step of a second information transmitting means transmitting information showing that said advertising information is acquired, if said display means displays advertising information and mutual communication with the side of said radio communications network is performed after acquiring said advertising information.

BRIEF DESCRIPTION OF THE DRAWINGS

FIG. 3 shows a pattern diagram of the homepage of advertising distribution service that an advertising information management server provides for an advertisement offer terminal.

FIG. 4 shows a pattern diagram of the E-mail reception list which a mobile terminal displays.

FIG. 5 shows a pattern diagram of the advertising mail which a mobile terminal displays.

BEST MODE OF CARRYING OUT THE INVENTION

Figure 1:
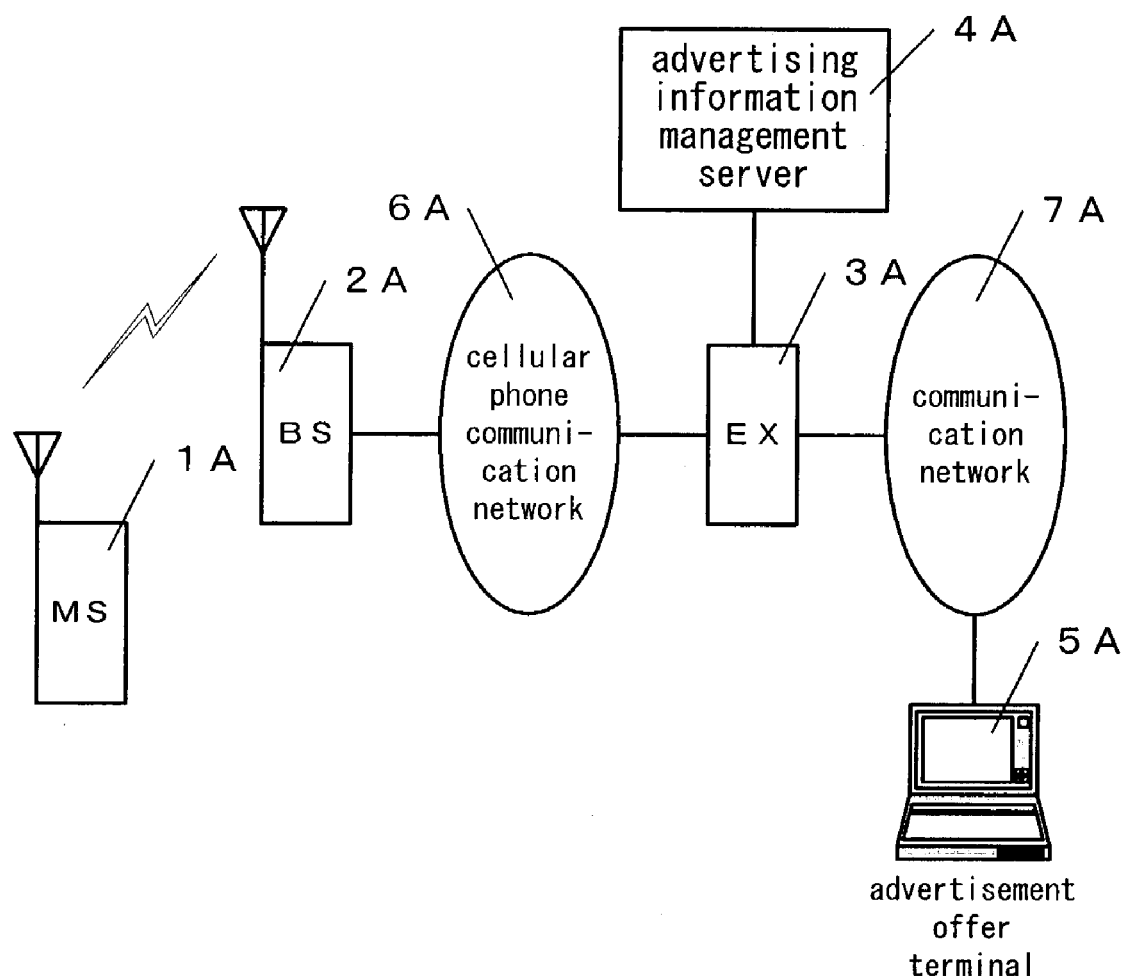
FIG. 1 shows a basic composition of a radio communication service providing system which may incorporate the present invention.

At first, the words & phrases and the definition which are used in this specification are defined.

A "control channel" is a communication channel which a radio communication device supervises in a waiting mode, and is for a base station broadcasting a call number which received a telephone call or a communication request and for a radio communication device which is in agreement with the self identification number making a call connection by answering to the broadcasting of a base station according to a predetermined call connection procedure. Therefore, power consumption for a supervising operation in a waiting mode can be stopped low, since a control signal is only received.

A "broadcast channel" or a "paging channel" is a communication channel which a radio communication device supervises in a waiting mode, and for an advertising information management server broadcasting advertising information to be distributed or distribution place information of said advertising information to a radio communication device. Therefore, since the operation for receiving advertising information or distribution place information in a waiting mode only receives advertising information, power consumption can be decreased. However, when advertising information is distributed from an advertising information management server after communication line connection, since transmitting operation is required for radio communication device, electric power required for it is consumed. In addition, although a control channel and a broadcast channel are usually another frequency and a radio communication device receives required information by switching receiving frequency in a waiting mode, it is also possible to lose the switch of the reception frequency by making another channel (another time slot) in control channel where frequency is the same a broadcast channel.

Next, it explains the form of the execution of this invention in detail with the drawing separately for the example of the first execution and the example of the second execution.

THE FIRST EMBODIMENT

FIG. 1 shows a basic composition of a radio communication service providing system which may incorporate the present invention. In addition, this system is suitable for CDMA (code division multiple access) communication method by not only PDC or PHS telecommunication system but the IS-95 standard or the IMT-2000 standard of the third generation (Wide Band CDMA or CDMA2000).

(1A) is a portable terminal as a radio communication equipment that the user of the wireless communication service offer system (namely, RADIO COMMUNICATION SERVICE PROVIDING SYSTEM) uses, not only neither a basic voice, nor the image communication function (that is, video conferencing telephone function), and E-mail or the character communication function, and the positional detection function by GPS (Global Positioning System) is possessed.

(2A) is a base station which covers the service area of the wireless communication service offer system, and the portable terminal (1A) to which the position is registered and a necessary signal are sent and received, and the above-mentioned voice and the image communication, the E-mail function, and the character communication function, etc. are achieved. Moreover, the base station informs the radio communication device in a waiting mode for the call number in which the telephone call or the communication demand are received through the control channel, and for the advertising information or the destination address information on said advertising information that the advertising information management server should deliver through the broadcast channel.

(3A) is a exchange bureau which controls the base station (2A) in the wireless communication service offer system via the cellular phone communication network (6A), and controls the connection with the communication network (7A) which consists of the public circuit (PSTN) or the Internet communication network.

(4A) is an advertising information management server, and acquires advertising information and destination address information which should be delivered from the advertisement offer terminal (5A) to the portable terminal (1A). Moreover, the advertising information management server (4A) has all user's personal information (for instance, age, sex, occupation, structure of one's family, hobby, and purchase commodity, etc.) on the portable terminal (1A) and information on the advertiser (for instance, place in the shop, handling commodity, and delivery conditional expression, etc.) by the data base, and retrieves the user of the portable terminal (1A) who satisfies the condition specified from the advertisement offer terminal (5A) by using the information. Especially, the advertising information management server (4A) acquires positional information from the portable terminal (1A) which has the positional detection function, and measures the position of the portable terminal (1A) by using the base station (2A) and transmits advertising information to the portable terminal 1A in the region that the advertisement offer terminal (5A) specified. Still more, the conventional portable terminal as a prior art which detects the position by using GPS are indicated by Provisional Publication No. OPH9-247730, OPH10-103992, OPH10-257555, OPH11-27736, OPH11-27729 etc. Moreover, a prior art which detects the position by using the base station are indicated by Provisional Publication No. OPH4-229729, OPH7-38951, OPH8-191266, OPH9-159746 and OPH9-161177 etc., and it is needless to say that these technologies can be used for the present invention. The advertisement offer terminal 5A is usually a PC (Personal Computer), and it is also possible to transmit advertising information and destination address information directly from the portable terminal 1A which has the Internet connection function (for instance, I-mode and EZ web) and PDA (Personal Digital Assistance), etc. to the advertising information management server (4A).

In addition, the communication network (7A) is connected with the electronic commerce main frame that bank and credit company etc. use for electronic commerce and the register management server that manages register that shop and supermarket etc. use to liquidate purchase price and does electronic commerce, though it does not describe in FIG. 1. As a result, if the cash card is passed through the card reader of the register when the commodity is bought, purchase price information (information that the discounted price contains) is transmitted from the register management server to the electronic commerce main frame via the communication network (7A), and it is possible to liquidate cashless. In addition, the cash card function can be provided for the radio communication device which improves hiding secretly, and the electronic settlement is possible by exchanging necessary information for EC (Electric Commerce) with register, register management server and electronic commerce main frame according to a wireless communication by IrDA of infrared date communication or Bluetooth standard.

Figure 2:
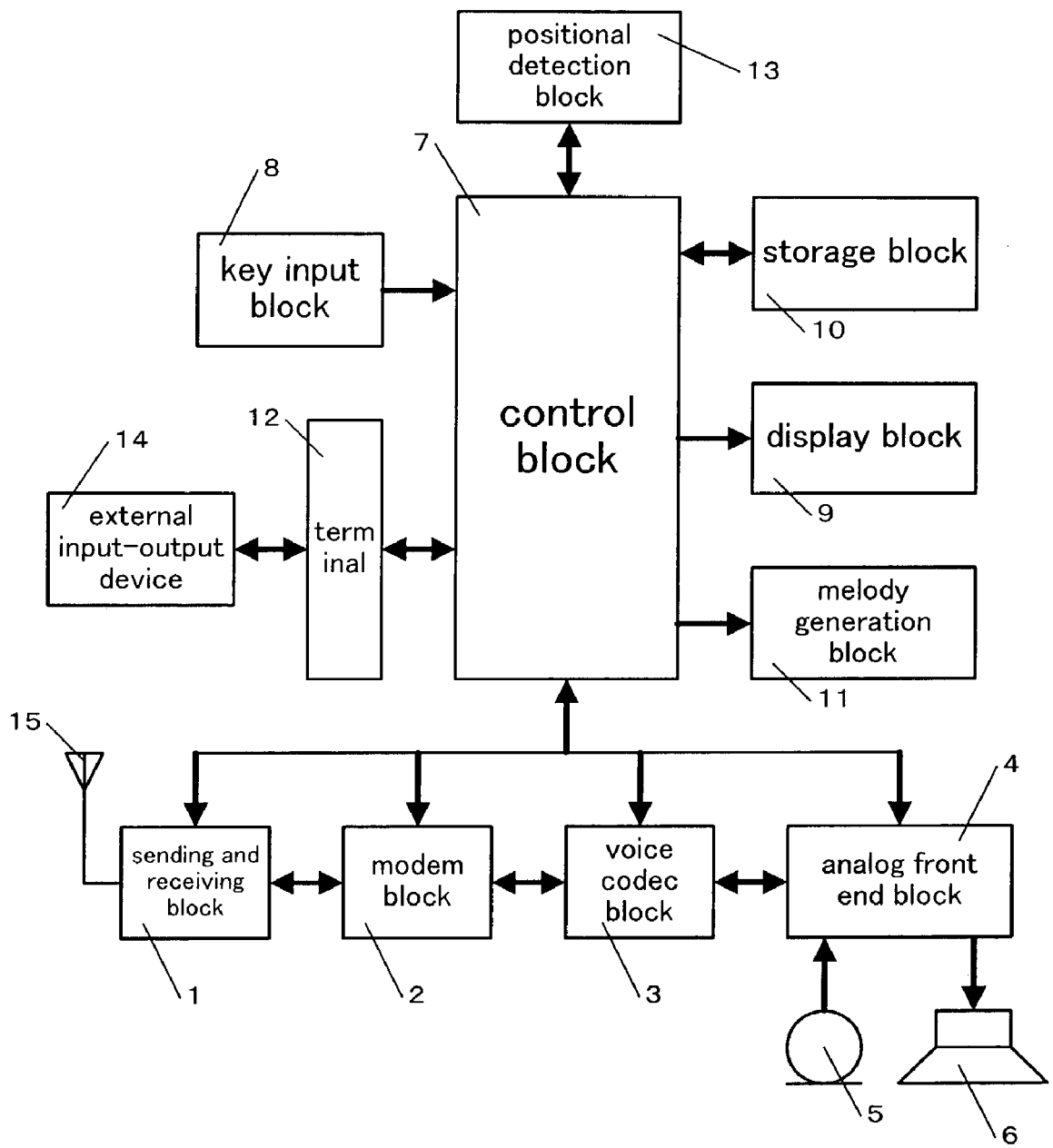
FIG. 2 shows a composition block diagram of a radio communication device which may incorporate the present invention.

FIG. 2 shows a composition block diagram of a radio communication device which may incorporate the present invention.

(1) is a sending and receiving block. The block (1) converts the electric wave signal received with antenna (15) into the intermediate frequency belt, and converts the transmission signal of the intermediate frequency belt into a radio frequency belt and transmits the signal.

(2) is a modem block which modulates and demodulates the sending and receiving signal.

(3) is a voice codec block which encodes and decodes the audio signal.

(4) is an analog front end block which converts the encoded audio signal from digital to analogue and drives receiver (6), and converts the audio signal input by mike (5) from analogue to digital and outputs to voice codec (3).

(7) is a control block which controls all of the radio communication device like a control necessary for the telephone call (For instance, a control of positional registration, waiting, link establishment and hand over so on) and the display control, etc. Especially, the control block (7) transmits positional information that the positional detection block described later detected according to the demand of the advertising information management server (4A). And the control block (7) directs the reception when judged to be located in the delivery area of advertising information based on delivery area information in destination address information and present location information, and the reception condition (especially, positional condition) is satisfied and receives advertising information. However, when the radio communication device is located by returning again in the delivery area once after it goes out besides the delivery area of advertising information, if the information which has received the advertising information to the advertising information storage block described later is memorized, the same advertising information shall not be received.

(8) is a key input block which inputs necessary data according to a prescribed operational procedure.

(9) is a display block which consists of color liquid crystal display device (Hereafter, it is said, "Color LCD"), organic EL (organic electronic luminescence) and PDP (plasma display panel) etc., and displays necessary information like the caller data and the image data, etc.

(10) is a storage block which memorizes telephone book data used for calling or for transmitting E-mail, the image data of the photograph etc., music data of calling melody and waiting melody (melody to wait for telephone call) data etc. Especially, a prescribed area in the storage block (10) is allocated in the advertising information storage block where content and advertisement ID of advertising information are memorized.

(11) is a melody generation block which generates the calling melody based on the music data of the calling melody memorized in the storage block (10) or the received music data. Moreover, when the reservation key of the key input block (8) is operated while talking over the telephone, the calling melody corresponding to the other party of the telephone call is transmitted via the modem block (2), the sending and receiving block (1), and the antenna (15). However, it might pass the voice codec block (3).

(12) is a terminal for a external connection. Via the terminal (12), the image data and the music data are input from an image data input device such as DSC (digital still camera) or DVC (digital video camera), or a music device corresponding to MIDI, etc. Moreover, it is also possible to acquire positional information from the device which has the positional detection function such as the car navigation devices as the external input-output device (14). That is, positional information is obtained from the car navigation device installed by the car via the terminal (12).

(13) is a positional detection block which detects the position by using GPS which is a well-known technology (triangulation etc.). When the advertising information management server has the positional detection function, this positional detection block (13) is not necessarily necessary.

Next, it explains the outline of the wireless communication service offer system (namely, the RADIO COMMUNICATION SERVICE PROVIDING SYSTEM) of this invention composed as the above-mentioned.

This wireless communication service offer system is for the advertising information management server to select the target user from among the user of the radio communication device according to the condition in destination address that the advertiser specified, and to transmit the offered advertising information at the right time without uselessness.

According to the condition in destination address that the advertiser specified, this wireless communication service offer system is to select the user who makes it to the target by the advertising information management server from among the user of the radio communication device. As for the communication network, wireless communication networks of PDC, PHS, GSM, and the CDMA method, etc. and the public service telephone network (PSTN) and the Internet are used.

First of all, the user of the radio communication device should conclude the wireless telephone use contract with the telecommunications carrier (for instance, NTT DoCoMo, KDDI or AU and J-Phone, etc.) as executed so far when this system is used, as a result, the user comes to be able to receive providing with the wireless communication service for voice telephone call or mail sending/receiving, etc. for the first time. And, it explains in this case as an example of though the advertising delivery trader delivers the advertising information from the advertising information management server to the user because it is forecast that the telecommunications carrier holds the advertising delivery trader concurrently. However, there is no problem even if the advertising delivery trader is different from the telecommunications carrier.

The telecommunications carrier which does the advertising delivery service will recommend the advertising delivery service contract to be added when the user is concluded with the wireless telephone use contract. Moreover, this contract has the advantage for the user because it can discount the use charge based on this telephone use contract more than usually as compensation which sees advertising information that the telecommunications carrier delivers to the radio communication device. And, this discount is decided depending on the number and the amount of advertising information that the user received. For instance, it means that the discount of five yen per each of advertising information that the user received, or the discount according to advertising volume of data are performed. If the method of sending back the advertising file ID and the device ID to the advertising information management server is adopted when the radio communication device opens the advertising file to prove the user saw advertising information, the reliability of the advertising delivery system can be improved. Moreover, the advertising information management server may transmit the map where user's position and the position of the shop are shown by the demand from the radio communication device.

On the other hand, the telecommunications carrier collects the charge of advertising information distribution from the advertiser instead of discounting a user's use charge. This charge of distribution is determined by the number and quantity of advertising information which were transmitted to the user. For example, 10 yen per each of advertising information transmitted to the user are collected, or it collects according to the amount of advertising data. Moreover, the telecommunications carrier provides the advertiser with the total of the advertising information which transmitted, the number of the user who looked at it and personal information (for example, age, sex, an occupation, etc.). The advertiser can grasp the sales effect over advertising expense exactly by this. Moreover, if the advertiser takes the selling strategy of discounting a goods purchase price when a user presents the advertisement distributed to the radio communication device, the improvement in sales will be expected further.

Next, it explains the movement of the RADIO COMMUNICATION SERVICE PROVIDING SYSTEM which lies this invention composed as the above-mentioned.

When the telecommunication carrier (That is, he is holding the advertising delivery trader concurrently.) concludes the user or the advertiser with the advertising delivery service contract, the information of the user and the advertiser used for an advertising delivery (advertiser ID and password, etc.) is registered in the advertising information management server, and it enters the state that this system can be used. Still more, the fish shop (the name is ABC fish shop) in a super-so on where the shop is set up is taken up as one example of the advertiser, but the hamburger shop and the lunch sales, etc. are also applicable.

First of all, the storekeeper of the fish shop which is the advertiser buys a large amount of fresh saury to sell for largeness sale, and inputs information to deliver the advertisement for delivering to targets.

FIG. 3 shows a pattern diagram of the homepage of advertising distribution service that an advertising information management server provides for an advertisement offer terminal.

When the advertiser accesses the advertising delivery homepage by the advertisement offer terminal (5A), the advertising information entry homepage is displayed in the display of the advertisement offer terminal (5A) (Refer to FIG. 3(A)). If the advertiser inputs the advertiser ID and the password in the state of FIG. 3(A), the advertising information management server (4A) shifts to the advertising information input screen shown in FIG. 3(B) if those information is collated and attested.

It is also possible that the advertiser newly inputs an advertising message and the delivery condition as advertising information in the state of FIG. 3(B). However, advertising information which has already been input can be selected. The advertiser clicks the advertising messaging new input button, and, for instance, inputs "Today, fresh saury of Sanriku-oki is on largeness markets ! 300 yen for five ! Seeing the advertisement, 50 yen is further discounted". In addition, the delivery condition selection button is clicked, and the needed delivery condition is selected from two or more delivery conditions which have already been registered. For instance, the delivery condition of delivering it for the housewife from 20 years old to 49 years old who is within 1 Km, from 10 o'clock to 15 o'clock of today and to MAX 1000 people is selected. Importance here especially is distance information. For instance, the possibility of visiting the shop lowers even if an advertising message is sent to the target who are in 10 Km or 20 Km part from the supermarket, the reason is that it becomes difficult to obtain the advertising effectiveness.

And, returning to FIG. 3(B), if the transmission button is clicked, the advertising information is transmitted to the advertising information management server (4A). Moreover, if the correction button is clicked, the advertising information can be corrected. If the cancellation button is clicked, the input advertising information is canceled. It is possible to come off this homepage if the EXIT button is clicked. You may transmit an advertising message and the delivery condition by the file format as other methods of transmitting advertising information to the advertising information management server 4A in E-mail. Moreover, other methods of transmitting advertising information to the advertising information management server (4A) also include the method of transmitting an advertising message and the delivery condition by the file format in E-mail.

On the other hand, the advertising information management server (4A) hourly updates all user's positional information on the portable terminal (1A) which makes the advertising delivery service contract, and always understands the present location of those terminals. For instance, the measured positional information is transmitted for the portable terminal (1A) which has the positional detection function every time it demands of regularity. Moreover, it understands measuring the position of the portable terminal (1A) by using the base station (2A).This positional measurement principle obtains positional information by measuring the electric wave that the portable terminal (1A) transmits by two or more base stations (2A), and calculating the distance from each base station (2A) But, even without adopting such a complex positional measurement method, this system is approved only to the recognition of a rough position by the base station (2A) where the portable terminal (1A) only registers the position. However, a detailed distance cannot be specified in this case for a search condition.

The advertising information management server (4A) confirms whether the transmission time is specified for a delivery condition when the advertising information mentioned above is received. In this case, the portable terminal (1A) which satisfies other delivery conditions is retrieved after waiting for that time to come because the delivery beginning time is 10 o'clock. The advertising information management server (4A) recognizes the portable terminal (1A) which satisfies the condition within 1 Km from the supermarket based on positional information on the portable terminal (1A) understood becoming ten o'clock of the delivery beginning time. In addition, the user who satisfies the condition of housewife from 20 to 49 years old by the individual information data base is retrieved. To the portable terminal (1A) of the corresponding user with the name of ABC fish shop which is the advertiser, the advertisement message of "Today, fresh saury of Sanriku-oki is on largeness markets ! 300 yen for five ! Seeing the advertisement, 50 yen is further discounted" is transmitted with the character message or the document file, and the total is memorized until the number of deliveries reaches 1000 people. Moreover, in this case the advertisement ID corresponding to this advertising message is added to the individual information data base as an item, and the transmitted flag is hoisted. As a result, it comes never to transmit the same advertising message to the same user more than once. That is, even if the portable terminal (1A) returns again in a specified region once after it goes out besides the designated area, when this transmission flag stands, the same advertising message is not transmitted. It is assumed that this advertising message was transmitted at 10:00 Sep. 4, 2000.

When received the delivery of an advertising message from the advertising information management server (4A) by E-mail, the portable terminal 1A generates the beep sound, and the user is informed of it. And, the user of the portable terminal (1A) operates key input part (8) and the E-mail reception list is called.

FIG. 4 shows a pattern diagram of the E-mail reception list which a mobile terminal displays.

When the call instruction of the E-mail reception list is received, the control part (7) displays the E-mail reception list in display part 9. In this E-mail reception list, there is Number, Other Party/Kind, Date, Time, Read/Unread as an item. As the advertising message, Number is "01", Other Party/Kind is "Advertisement", Date is "Sep. 4, 2000", Time is "10:00", Read/Unread is "Unread" are displayed. It is shown that the one enclosed with a square frame is E-mail which has been selected. If an up-and-down key of key input part (8) is operated, a square frame moves up and down, and other E-mail can be selected.

Moreover, Number "02" is the advertising mail which received at 14:00 on Sep. 2, 2000, and the one which has already been read are shown. Number "03" is the E-mail received from the cellular phone, and the one which has not been read yet are shown. Number "04" is the advertising mail received at 8:00 on Sep. 2, 2000, and the one which has already been read are shown. Number "05" is the E-mail received from the cellular phone of Hanako Yamada, and the one which has been read are shown. The reason why the name is displayed as Hanako Yamada is that the received other party telephone ID is registered in the telephone book memory, and the name corresponding to it is called. Accordingly, the reason why the other party's telephone ID is displayed in number 03 is that the received other party telephone ID is not registered in the telephone book memory. Number "06" is the E-mail received from E-mail address of "hanako@abc.cojp." via the Internet, and the one which has been read are shown. And, number "07" is the advertising mail which received at 11:25 on Sep. 1, 2000, and the one which has not been read yet are shown. Because this number 07 is the past one, the Control part (7) may add information of the time for an automatic deletion, and delete it from the E-mail reception list. It omits to show in FIG. 4 though the E-mail received under that is displayed. If the OK key of key input part (8) is operated with number 01 of FIG. 4 selected, the details are displayed.

FIG. 5 shows a pattern diagram of the advertising mail which a mobile terminal displays.

When the instruction of a detailed display of the selected advertising mail is received, the control part (7) displays details of advertising mail in display part (9). As the details of this advertising mail, it is shown that the advertiser is ABC fish shop, and the advertising message is "Today, fresh saury of Sanriku-oki is on largeness markets ! 300 yen for five ! Seeing the advertisement, 50 yen is further discounted". With this display, when the key corresponding to the displayed OK button is pushed by operating key input part (8), the control part (7) is transmitted the read information which shows that this advertising message was seen, and returns to the E-mail reception list display of FIG. 4. And with this display of FIG. 5, when the key corresponding to the displayed map button is pushed by operating key input part (8), the map data demand information is transmitted with the read information which shows that this advertising message was seen in the advertising information management server (4A). However, when an advertising message is displayed even without pushing the OK button and the map button, the read information may be transmitted. When the key corresponding to the menu button is pushed, it shifts to the input screens of preservation or the deletion, etc. of advertising mail, but the explanation is omitted because it does not relate directly to this invention.

Figures 6, 7:
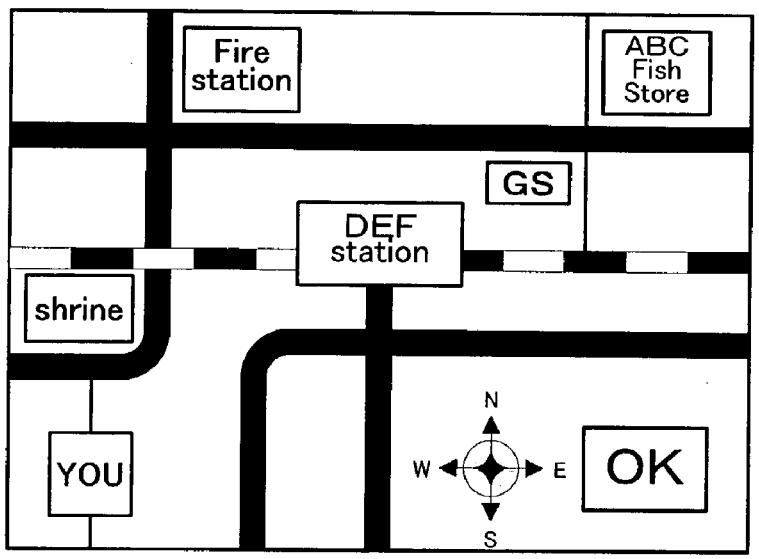
FIG. 6 shows a pattern diagram of the Map information which a mobile terminal displays.
FIG. 7 shows a pattern diagram of the advertising transmission result report that an advertising information management server transmits.

FIG. 6 shows a pattern diagram of the Map information which a mobile terminal displays.

When the map data is received from the advertising information management server (4A), the control part (7) displays the map in display part 9. The user who saw this map recognizes the position (you is displayed under the left) where he is. It goes to the north in the narrow road, and turns to the right in front of the shrine. The railroad crossing in the west of DEF station advances and it advances toward the east in four corner in the extending fire station. ABC fish shop is learnt before the diagonal of the gas station (GS and display of upper right). Under such a condition, it returns to the E-mail reception list display of FIG. 4 when the key corresponding to the displayed OK button is pushed of operating key input part (8). Moreover, the user puts the portable terminal (1A) into the state of waiting by a prescribed key operation.

When the read information mentioned above is received, the advertising information management server (4A) hoist the read flag in advertisement ID of the individual information data base. However, because the user only saw the advertisement of largeness sale which has already ended and it is too insignificant as the advertisement even if received the read information to number "07" of FIG. 4, the read flag might not be hoisted. The reason is that the use charge is discounted according to the number of this read flags and volume of data. The advertising information management server (4A) is managed at the preservation time limit of delivered advertising information. The read flag might not be hoisted because it deletes it from the data base when the advertiser passes the input delivery time limit.

Moreover, the advertising information management server (4A) reads the identification number of the largeness sale commodity (in this case, saury) by the advertising message, the amount of discount and the number of cash card or debit card that owner of the portable terminal (1A) uses by electronic commerce from the individual information data base, and transmits to the electronic commerce main frames such as banks or the credit companies. When map data demand information is received, the advertising information management server (4A) is accessed to the map data base, and transmits the map data processed as the present location of the portable terminal (1A) and the shop of the advertiser must be displayed most greatly. In this case, the map data may make it transmit by the file format which compresses the data such as GIF, MPEG, and JPEG. The advertising information management server (4A) arranges the destination address and the read/unread information on the advertisement based on the transmitted flag and the read flag, and transmits to the advertisement offer terminal (5A) or prints on paper by hope and mails it to the advertiser.

FIG. 7 shows a pattern diagram of the advertising transmission result report that an advertising information management server transmits.

The report shows that the advertising message of "Today, fresh saury of Sanriku-oki is on largeness markets ! 300 yen for five ! Seeing the advertisement, 50 yen is further discounted" has been transmitted to 1000 people for the housewife on Sep. 4, 2000, and (1) it delivers to 535 housewives from 20 to 29 years old, and 328 people read the advertisement, (2) it delivers to 359 housewives from 30 to 39 years old, and 274 people read the advertisement, and (3) it delivers to 106 housewives from 40 to 49 years old, and 28 people read the advertisement among those (total 630 people).

By the way, when confirming the advertising message and the address of ABC fish shop, the user of the portable terminal (1A) will go to the shop to buy the saury of the sale merchandise. Moreover, if the shop in the same supermarket has put on a similar advertisement, the user will look for and buy the sale merchandise. For instance, the advertising message that GHI fruit store sells persimmon and GHI vegetable store sells MATSUTAKE mushroom for sale is transmitted, and it is assumed that the user of the portable terminal (1A) has confirmed it.

The user of the portable terminal (1A) is clearing up at the cash register (Only omitted as "Register") of supermarket to buy rice 10 Kg of non-sale merchandise (price 4500 yen) in addition 5 saury (sale price 300 yen, and an advertising reader is further 50 yen off), 10 persimmons (The bargain sale price 800 yen, and an advertising reader is further 100 yen off, and 3 MATSUTAKE mushrooms (The bargain sale price 3000 yen, and an advertising reader is further 500 yen off).

With reading the price of the purchase commodity by the bar-code reader, the person in charge of the Register in the supermarket shows that the total of price 300 yen at 5 saury, price 800 yen at 10 persimmons, 3000 yen at 3 MATSUTAKE mushrooms and 4500 yen at rice 10 Kg is 8600 yen, and urges the user of the portable terminal (1A) to clear up by passing the cash card or the debit card used for the electronic commerce through the card reader.

When the user of the portable terminal (1A) passes the card through the card reader, the number of the cash card or the debit card, the identification number of the purchase commodities and the purchase amounts of money are transmitted to the electronic commerce main frame via the communication network.

When receiving these information, the electronic commerce main frame confirms that the identification number of the commodity (for instance, saury), the amount of discount and the number of card received from the advertising information management server (4A) is corresponding, and subtracts the amount of money in which the amount of the discount is totaled from the amount of money of purchase.

In this case, because 650 yen in total of 50 yen at 5 saury, 100 yen at 10 persimmons and 500 yen at 3 MATSUTAKE mushrooms is discounted, the electronic commerce main frame collects 7950 yen from the bank account etc. of the user of the portable terminal (1A) as an amount of money of purchase, and transmits the information to the Register of the supermarket via the communication network.

The Register of the supermarket issues the receipt of 7950 yen in the amount of purchase money based on information received from the electronic commerce main frame, because the discount is 650 yen and the amount of purchase money is 8600 yen, and the series of product advertisement and sales will be ended by passing it to the user of the portable terminal (1A). Further, you may make the discount subtracted from the purchase price when the user of the portable terminal (1A) displays an advertising message to the person in charge of the Register even without doing such an electronic commerce. It only has to transmit a newer discount advertisement at the right time when seeming to remain unsold though the largeness markets has done. And, the electronic closing of accounts is possible by exchanging necessary information for EC with the register, the register management server and the electronic commerce main frame according to a wireless communication by IrDA or the Blue-Tooth standard, providing the cash card function for the radio communication equipment which improves hiding secretly instead of the operation which passes the cash card through the card reader of the Register.

Moreover, as mentioned above, it can be assumed RADIO COMMUNICATION SERVICE PROVIDING METHOD which lies this invention by assuming the step or the process in the time series where each operation of RADIO COMMUNICATION DEVICE or RADIO COMMUNICATION SERVICE PROVIDING SYSTEM is explained.

In addition, the program which provides for the processing procedure of each operation that the control block of RADIO COMMUNICATION DEVICE or RADIO COMMUNICATION SERVICE PROVIDING SYSTEM does is memorized in the information storage medium (for instance, semiconductor memory, LD (laser disc), HD (hard disk), FD (flexible disk), MD (mini-disc), CD (compact disc) or DVD (digital video disc), etc.), and similar operation can be done by installing the processing procedure (for instance, application program) in various information processors.

Next, it explains the outline of RADIO COMMUNICATION SERVICE PROVIDING SYSTEM which lies the second embodiment composed as the above-mentioned. However, the explanation of the repetition part is omitted, because the explanation from FIG. 1 to FIG. 7 is almost similar to the example of the first embodiment.

According to the condition (especially, delivery area) in destination address specified from the advertiser, this wireless communication service offer system informs two or more radio communication equipment of the destination address condition with the paging channel (However, the control channel might be used) of the base station where the advertising information management server takes charge of the delivery area, and when the reception requirement is met, the radio communication equipment acquires advertising information that the advertising information management server offers with a traffic channel or a paging channel. And, the radio communication equipment is not to acquire the same advertising information even if it meets the reception requirement condition again when the advertising information is already acquired. As for the communication network, the wireless communication networks of PDC, PHS, GSM, and the CDMA method, etc., the PSTN and the Internet are used.

Next, it explains the operation of the wireless communication service offer system which lies the second embodiment (However, refer to the first embodiment for the explanation from FIG. 1 to FIG. 3.).

At first, the advertising information management server (4A) confirms whether the transmission time is specified for a delivery condition when received the advertising information explained in FIG. 3. And, when becoming ten o'clock of the delivery beginning time, it recognizes one or plural base station which takes charge within 1 Km from the supermarket, and informs of the destination address information on advertising information with those paging channels of the base station 2A.

The portable terminal (1A) observes the control channel specified from the base station (2A) which registers the position in intermittent while waiting. When the informed call number is corresponding to the own identification number, the portable terminal (1A) does the telephone call connection according to the prescribed call connection procedure with the base station (2A), and becomes possible to send and receive the telephone call and data with the other party side by sending and receiving the audio signal with a traffic channel. Moreover, the portable terminal (1A) understands own present location based on positional information of which the base station informs on control channel observed intermittent. However, if the positional detection function by GPS is possessed, it understands voluntarily measuring present location.

In addition, the portable terminal (1A) acquires the destination address information of the advertising information of which the advertising information management server (4A) informed on the paging channel, and judges whether to be located in the delivery area of advertising information based on the delivery area information and the own present location information. And, when other conditions (for instance, housewife from 20 to 49 years old) in destination address information are satisfied, and if located in the delivery area, all of advertising information informed on the paging channel similarly are received. In this case, the advertising information is informed in each packet, and the advertising data of each packet is a form like advertisement ID, total data, a data number and advertising data. The portable terminal (1A) is enabled for all of advertising information to be displayed by connecting advertising data in order of the data number after all the advertising data specified by the data total is received. However, when the advertising information management server (4A) informs on the paging channel only of destination address information of the advertising information, to the prescribed call connection procedure to receive the delivery of advertising information which meets the reception requirement, the portable terminal (1A) does the telephone call connection with a base station according, and receives the advertising information with a traffic channel (data communication channel). For instance, with the name of ABC fish store of the advertiser, the advertising message of "Today, fresh saury of Sanriku-oki is on largeness markets ! 300 yen for five ! Seeing the advertisement, 50 yen is further discounted" is received with the character message or the document file.

Moreover, when the advertising information is acquired with a paging channel, and if the intercommunication with a wireless communication network is done since the advertising information is acquired, the portable terminal (1A) transmits the information which shows the advertising information was acquired (Hereafter, it is also said "the Received Information") to the advertising information management server (4A). In addition, when the advertising information is displayed, and if intercommunication with a wireless communication network is done since the advertising information is displayed, the portable terminal (1A) transmits the Received Information of the advertising information.

The advertising information management server (4A) memorizes the delivery total of advertising information transmitted to the plural of the portable terminal (1A) according to the number in which advertising information is transmitted with a traffic channel or the number of the Received Information of the advertising information, and continues until the number of deliveries reaches 1000 people. In this case, the advertisement ID corresponding to this advertising message is added to the individual information data base as an item, and the transmitted flag is hoisted. As a result, it comes never to transmit the same advertising message to the same user more than once. That is, even if the portable terminal (1A) returns again in the specified region once after it goes out besides the designated area, and if this transmission flag stands, the same advertising message is not transmitted. Hereafter, the explanation is omitted because it is the same as the first embodiment.

INDUSTRIAL APPLICABILITY

As explained above, according to RADIO COMMUNICATION SERVICE PROVIDING SYSTEM, RADIO COMMUNICATION DEVICE, RADIO COMMUNICATION SERVICE PROVIDING METHOD, AND RADIO COMMUNICATION METHOD of this invention, because the use charge is discounted based on the advertising message that the telecommunications carrier or the advertising delivery trader transmitted, the user also contracts with pleasure, and the resistance to the receipt of an advertising message is lost.

Moreover, because the advertising message is transmitted to the target which exists in a prescribed distance or less based on the shop of the advertiser, the effect of an advertising delivery is very high. And, it is possible to contribute to the prevention of unsold stuff because a timely advertising message can be delivered according to the sale of the commodity.

The invention claimed is:

1. A radio communication service providing system in which a user of a radio communication device pays a predetermined charge by receiving a radio communications service from a telecommunication carrier via a radio communications network, the system comprising:
   a position measurement means for measuring the present position of said radio communication device; and
   an advertising information management server for receiving advertising information to be distributed and distribution place information, and for transmitting said advertising information to said radio communication device,
   wherein said advertising information management server transmits said advertising information to said radio communication device which is present in a designated place region based on the present position of said radio communication device measured by said position measurement means and position information included in said distribution place information, and said radio communication device receives said advertising information transmitted by said advertising information management server, however, said advertising information management server does not transmit the same advertising information to said radio communication device, even if said radio communication device once comes out and returns within said designated place again,
   wherein said radio communication device transmits map data request information with read information which means said advertising information was already read to said advertising information management server, if the key corresponding to MAP button is pushed in the state where a display block shows the details of said advertising information and MAP button, and wherein said advertising information management server accesses a map database and transmits map data processed to display the present position of said radio communication device and an advertiser's store most greatly, if said advertising information management server received said map data request information.

2. A radio communication service providing system according to claim 1, in which said advertising information management server transmits said advertising information to a radio communication device up to the number of distribution contained in said distribution place information.

3. A radio communication service providing system according to claim 1, in which said advertising information management server eliminates said advertising information from a database, if the inputted distribution term of said advertising information passes.

4. A radio communication service providing system according to claim 1, in which said position measurement means measures the present position of said radio communication device by the position detection function of GPS which said radio communication device possesses.

5. A radio communication service providing system according to claim 4, in which said advertising information management server makes said radio communication device transmit the position information of said radio communication device periodically or whenever required which said GPS measured.

6. A radio communication service providing system according to claim 1, in which said position measurement means measures the present position of said radio communication device by using the base station which transmits and receives the required signals with said radio communication device and carries out a position registration.

7. A radio communication service providing system according to claim 6, in which said position measurement means measures the present position of said radio communication device by measuring the electric wave from said radio communication device using a plurality of said base stations and calculating the distance from each base station.

8. A radio communication service providing system according to claim 1, in which said radio communication device returns an advertising file ID of said advertising information which was distributed to said advertising information management server.

9. A radio communication service providing system according to claim 8, in which said radio communication device returns said advertising file ID of said advertising information to said advertising information management server when said radio communication device opens said advertising information.

10. A radio communication service providing system according to claim 1, in which said radio communication device returns said advertising file ID and device ID to said advertising information management server.

11. A radio communication service providing system according to claim 10, in which said radio communication device returns said advertising file ID and device ID to said advertising information management server when said radio communication device opens said advertising information.

12. A radio communication service providing system according to claim 1, in which said radio communication device transmits read information which means said advertising information was already read to said advertising information management server, if the key corresponding to O.K. button is pushed in the state where a display block shows the details of said advertising information and O.K. button.

13. A radio communication service providing system according to claim 1, in which said radio communication device transmits read information which means said advertising information was already read to said advertising information management server, if said advertising information is displayed on a display block.

14. A radio communication service providing system according to claim 12, in which said advertising information management server stands a read flag to an advertising ID item corresponding to said advertising information, if said read information is received.

15. A radio communication service providing system according to claim 14, in which said advertising information management server does not stand a read flag to an advertising ID item corresponding to said advertising information, when said advertising information is already finished, even if said read information is received.

16. A radio communication service providing system according to claim 14, a use charge of said radio communication device is discounted by the number of said read flag.

17. A radio communication service providing system according to claim 14, in which said advertising information management server does not transmit the same advertising information to said radio communication device, even if said radio communication device once comes out and returns within said designated place again by a transmitted flag stood to an advertising ID item corresponding to said advertising information, when said advertising information is transmitted to said radio communication device.

18. A radio communication service providing system according to claim 17, in which said advertising information management server arranges the distribution place of an advertisement and read or not-read information, and transmits to an advertisement offer terminal based on said transmitted flag and said read flag.

19. A radio communication service providing system according to claim 1, in which said radio communication device eliminates said advertising information from an E-mail reception list by the time information for automatic elimination added to received said advertising information.

20. A radio communication service providing system according to claim 1, further comprising an electronic commerce main frame for a bank or a credit company to use electronic commerce;
said electronic commerce main frame collects the money, which is deducted the amount of discount of the goods of advertising information displayed on said radio communication device from the purchase amount of money, from the bank account of said radio communication device's user.

21. A radio communication service providing system according to claim 20, in which said electronic commerce main frame collects the money, which is deducted the amount of discount of the goods of advertising information displayed on said radio communication device from the purchase amount of money based on the identification number of the goods, the amount of discount transmitted by said advertising information management server, the number of a money card or a debit card used by electronic commerce, and purchase price information transmitted by a register management server via the communication network, from the bank account of said radio communication device's user.

22. A radio communication service providing system according to claim 1, further comprising a register for a store or a supermarket to use for liquidation of a purchase price;

said register publishes a receipt deducted the amount of discount of the goods of advertising information displayed on said radio communication device from the purchase amount of money.

23. A radio communication service providing system according to claim 22, in which said register publishes a receipt deducted the amount of discount of the goods of advertising information displayed on said radio communication device from the purchase amount of money based on the collected information via a communication network when said electronic commerce main frame has collected the money deducted the amount of discount from the bank account.

24. A radio communication service providing method used in a radio communication service providing system in which a user of a radio communication device pays a predetermined charge by receiving a radio communications service from a telecommunication carrier via a radio communications network, and having a position measurement means for measuring the present position of said radio communication device and an advertising information management server for receiving advertising information to be distributed and distribution place information, and for transmitting said advertising information to said radio communication device, the method comprising the steps of:

said advertising information management server transmitting said advertising information to said radio communication device which is present in a designated place region based on the present position of said radio communication device measured by said position measurement means and position information included in said distribution place information;

said radio communication device receiving said advertising information transmitted by said advertising information management server;

said advertising information management server not transmitting the same advertising information to said radio communication device, even if said radio communication device once comes out and returns within said designated place again;

said radio communication device transmitting map data request information with read information which means said advertising information was already read to said advertising information management server, if the key corresponding to MAP button is pushed in the state where a display block shows the details of said advertising information and MAP button; and said advertising information management server accessing a map database and transmitting map data processed to display the present position of said radio communication device and an advertiser's store most greatly, if said advertising information management server received said map data request information.

25. A radio communication service providing method according to claim 24, in which said transmitting step transmits said advertising information to a radio communication device up to the number of distribution contained in said distribution place information.

26. A radio communication service providing method according to claim 24, further comprising;
a step of said advertising information management server eliminating said advertising information from a database, if the inputted distribution term of said advertising information passes.

27. A radio communication service providing method according to claim 24, further comprising;

a step of said position measurement means measuring the present position of said radio communication device by the position detection function of GPS which said radio communication device possesses.

28. A radio communication service providing method according to claim 27, further comprising;
a step of said advertising information management server making said radio communication device transmit the position information of said radio communication device periodically or whenever required which said GPS measured.

29. A radio communication service providing method according to claim 24, further comprising;
a step of said position measurement means measuring the present position of said radio communication device by using the base station which transmits and receives the required signals with said radio communication device and carries out a position registration.

30. A radio communication service providing method according to claim 29, further comprising;
a step of said position measurement means measuring the present position of said radio communication device by measuring the electric wave from said radio communication device using plurality of said base station and calculating the distance from each base station.

31. A radio communication service providing method according to claim 24, further comprising;
a step of said radio communication device returning an advertising file ID of said advertising information which was distributed to said advertising information management server.

32. A radio communication service providing method according to claim 31, further comprising;
a step of said radio communication device returning said advertising file ID of said advertising information to said advertising information management server when said radio communication device opens said advertising information.

33. A radio communication service providing method according to claim 24, further comprising;
a step of said radio communication device returning said advertising file ID and device ID to said advertising information management server.

34. A radio communication service providing method according to claim 33, further comprising;
a step of said radio communication device returning said advertising file ID and device ID to said advertising information management server when said radio communication device opens said advertising information.

35. A radio communication service providing method according to claim 24, further comprising;
a step of said radio communication device transmitting read information which means said advertising information was already read to said advertising information management server, if the key corresponding to O.K. button is pushed in the state where a display block shows the details of said advertising information and O.K. button.

36. A radio communication service providing method according to claim 24, further comprising;
a step of said radio communication device transmitting read information which means said advertising information was already read to said advertising information management server, if said advertising information is displayed on a display block.

37. A radio communication service providing method according to claim 35, further comprising;

a step of said advertising information management server standing a read flag to an advertising ID item corresponding to said advertising information, if said read information is received.

38. A radio communication service providing method according to claim 37, further comprising;
a step of said advertising information management server not standing a read flag to an advertising ID item corresponding to said advertising information, when said advertising information is already finished, even if said read information is received.

39. A radio communication service providing method according to claim 37, further comprising;
a step of a use charge of said radio communication device being discounted by the number of said read flag.

40. A radio communication service providing method according to claim 37, further comprising;
a step of said advertising information management server not transmitting the same advertising information to said radio communication device, even if said radio communication device once comes out and returns within said designated place again by a transmitted flag stood to an advertising ID item corresponding to said advertising information, when said advertising information is transmitted to said radio communication device.

41. A radio communication service providing method according to claim 40, further comprising;
a step of said advertising information management server arranging the distribution place of an advertisement and read or not-read information, and transmitting to an advertisement offer terminal based on said transmitted flag and said read flag.

42. A radio communication service providing method according to claim 24, further comprising;
a step of said radio communication device eliminating said advertising information from an E-mail reception list by the time information for automatic elimination added to received said advertising information.

43. A radio communication service providing method according to claim 24, the system further having an electronic commerce main frame for a bank or a credit company to use electronic commerce, and the method further comprising;
a step of said electronic commerce main frame collecting the money, which is deducted the amount of discount of the goods of advertising information displayed on said radio communication device from the purchase amount of money, from the bank account of said radio communication device's user.

44. A radio communication service providing method according to claim 43, the step of collecting collects the money, which is deducted the amount of discount of the goods of advertising information displayed on said radio communication device from the purchase amount of money based on the identification number of the goods, the amount of discount transmitted by said advertising information management server, the number of a money card or a debit card used by electronic commerce, and purchase price information transmitted by a register management server via the communication network, from the bank account of said radio communication device's user.

45. A radio communication service providing method according to claim 24, the system further having a register for a store or a supermarket to use for liquidation of a purchase price, and the method further comprising;

a step of said register publishing a receipt deducted the amount of discount of the goods of advertising information displayed on said radio communication device from the purchase amount of money.

46. A radio communication service providing method according to claim 45, the step of publishing publishes a receipt deducted the amount of discount of the goods of advertising information displayed on said radio communication device from the purchase amount of money based on the collected information via a communication network when said electronic commerce main frame has collected the money deducted the amount of discount from the bank account.

47. A radio communication service providing system in which a user pays a predetermined charge by receiving a radio communications service from a telecommunication carrier via a radio communications network, the system comprising:
a radio communication device which supervises a control channel specified by a base station of said radio communications network in a waiting mode, and becomes possible to communicate by connecting with said base station for a telephone call according to a predetermined connection procedure when a broadcasted call number and a self ID number are in the same, and by transmitting and receiving a voice signal using a traffic channel;
a position measurement means for measuring the present position of said radio communication device; and
an advertising information management server for broadcasting distribution place information of advertising information to be distributed to said radio communication device using a broadcast channel of said base station,
wherein said radio communication device further comprises:
a distribution place information acquisition means for acquiring said distribution place information broadcasted on said broadcast channel in a waiting mode;
a judgment means for judging whether located in the distribution area of advertising information based on distribution area information in said distribution place information and the present position measured by said position measurement means;
a reception directions means for directing reception of said advertising information based on the judgment result of said judgment means;
an advertising information acquisition means for getting an advertising information corresponding to said distribution place information provided by said advertising information management server using said control channel or said traffic channel if said reception directions means directs reception;
an advertising information memory means for memorizing advertising information acquired by said advertising information acquisition means; and
a display means for displaying advertising information memorized in advertising information memory means; wherein said reception directions means directs reception of
said advertising information to said advertising information acquisition means when said judgment means judged the present place is in the distribution area of advertising information, however, does not direct reception to said advertising information acquisition means, even if said radio communication device once comes out and returns within said designated place again and said judgment means judged the present place is in the distribution area when the receive information of said advertising information is memorized in said advertising information memory means, wherein said radio communication device transmits map data request information with read information which means said advertising information was already read to said advertising information management server, if the key corresponding to MAP button is pushed in the state where a display block shows the details of said advertising information and MAP button, and wherein said advertising information management server accesses a map database and transmits map data processed to display the present position of said radio communication device and an advertiser's store most greatly, if said advertising information management server received said map data request information.

48. A radio communication service providing system according to claim 47, in which said radio communication device further comprising;
   a first information transmitting means for transmitting information showing that said advertising information is acquired, if said advertising information acquisition means acquires advertising information using said broadcast channel and mutual communication with the side of said radio communications network is performed after acquiring said advertising information.

49. A radio communication service providing system according to claim 47, in which said radio communication device further comprising;
   a second information transmitting means for transmitting information showing that said advertising information is acquired, if said display means displays advertising information and mutual communication with the side of said radio communications network is performed after acquiring said advertising information.

50. A radio communication service providing method used in a radio communication service providing system in which a user pays a predetermined charge by receiving a radio communications service from a telecommunication carrier via a radio communications network, and further having a radio communication device which supervises a control channel specified by a base station of said radio communications network in a waiting mode, and becomes possible to communicate by connecting with said base station for a telephone call according to a predetermined connection procedure when a broadcasted call number and a self ID number are in the same, and by transmitting and receiving a voice signal using a traffic channel, a position measurement means for measuring the present position of said radio communication device, and an advertising information management server for broadcasting distribution place information of advertising information to be distributed to said radio communication device using a broadcast channel of said base station, the method comprising the steps of:
   a distribution place information acquisition means acquiring said distribution place information broadcast on said broadcast channel in a waiting mode;
   a judgment means judging whether located in the distribution area of advertising information based on distribution area information in said distribution place information and the present position measured by said position measurement means;
   a reception directions means directing reception of said advertising information based on the judgment result of said judgment means;
   an advertising information acquisition means getting an advertising information corresponding to said distribution place information provided by said advertising information management server using said control channel or said traffic channel if said reception directions means directs reception;
   an advertising information memory means memorizing advertising information acquired by said advertising information acquisition means; and
   a display means displaying advertising information memorized in,
   wherein said reception directions means directs reception of said advertising information to said advertising information acquisition means when said judgment means judged the present place is in the distribution area of advertising information, however, does not direct reception to said advertising information acquisition means, even if said radio communication device once comes out and returns within said designated place again and said judgment means judged the present place is in the distribution area when the receive information of said advertising information is memorized in said advertising information memory means,
   wherein said radio communication device transmits map data request information with read information which means said advertising information was already read to said advertising information management server, if the key corresponding to MAP button is pushed in the state where a display block shows the details of said advertising information and MAP button, and
   wherein said advertising information management server accesses a map database and transmits map data processed to display the present position of said radio communication device and an advertiser's store most greatly, if said advertising information management server received said map data request information.

51. A radio communication service providing method according to claim 50, further comprising;
   a step of a first information transmitting means transmitting information showing that said advertising information is acquired, if said advertising information acquisition means acquires advertising information using said broadcast channel and mutual communication with the side of said radio communications network is performed after acquiring said advertising information.

52. A radio communication service providing method according to claim 50, further comprising;
   a step of a second information transmitting means transmitting information showing that said advertising information is acquired, if said display means displays advertising information and mutual communication with the side of said radio communications network is performed after acquiring said advertising information.

53. A radio communication device used in a radio communication service providing system where a user of a radio communication device pays a predetermined charge by receiving a radio communications service from a telecommunication carrier via a radio communications network, and the system having a position measurement means for measuring the present position of said radio communication device and an advertising information management server for broadcasting distribution place information of advertising information to be distributed to said radio communication device using a broadcast channel of said base station, and the device which supervises a control channel specified by a base station of said radio communications network in a waiting mode, and becomes possible to communicate by connecting with said base station for a telephone call according to a predetermined connection procedure when a broadcasted call number and a self ID number are in the same, and by transmitting and receiving a voice signal using a traffic channel, said radio communication device comprising:

- a distribution place information acquisition means for acquiring said distribution place information broadcasted on said broadcast channel in a waiting mode;
- a judgment means for judging whether located in the distribution area of advertising information based on distribution area information in said distribution place information and the present position measured by said position measurement means;
- a reception directions means for directing reception of said advertising information based on the judgment result of said judgment means;
- an advertising information acquisition means forgetting an advertising information corresponding to said distribution place information provided by said advertising information management server using said control channel or said traffic channel if said reception directions means directs reception;
- an advertising information memory means for memorizing advertising information acquired by said advertising information acquisition means; and
- a display means for displaying advertising information memorized in advertising information memory means;

wherein said reception directions means directs reception of said advertising information to said advertising information acquisition means when said judgment means judged the present place is in the distribution area of advertising information, however, does not direct reception to said advertising information acquisition means, even if said radio communication device once comes out and returns within said designated place again and said judgment means judged the present place is in the distribution area when the receive information of said advertising information is memorized in said advertising information memory means, wherein said radio communication device transmits map data request information with read information which means said advertising information was already read to said advertising information management server, if the key corresponding to MAP button is pushed in the state where a display block shows the details of said advertising information and MAP button, and wherein said advertising information arrangement server accesses a map database and transmits map data processed to display the present position of said radio communication device and an advertiser's store most greatly, if said advertising information management server received said map data request information.

54. A radio communication device according to claim 53, further comprising;

- a first information transmitting means for transmitting information showing that said advertising information is acquired, if said advertising information acquisition means acquires advertising information using said broadcast channel and mutual communication with the side of said radio communications network is performed after acquiring said advertising information.

55. A radio communication device according to claim 53, further comprising;

- a second information transmitting means for transmitting information showing that said advertising information is acquired, if said display means displays advertising information and mutual communication with the side of said radio communications network is performed after acquiring said advertising information.

56. A radio communication service providing method used in a radio communication service providing system in which a user of a radio communication device pays a predetermined charge by receiving a radio communications service from a telecommunication carrier via a radio communications network, and having a position measurement means for measuring the present position of said radio communication device and an advertising information management server for broadcasting distribution place information of advertising information to be distributed to said radio communication device using a broadcast channel of said base station, and further used in a radio communication device which supervises a control channel specified by a base station of said radio communications network in a waiting mode, and becomes possible to communicate by connecting with said base station for a telephone call according to a predetermined connection procedure when a broadcasted call number and a self ID number are in the same, and by transmitting and receiving a voice signal using a traffic channel, the method comprising the steps of:

- a distribution place information acquisition means acquiring said distribution place information broadcasted on said broadcast channel in a waiting mode;
- a judgment means judging whether located in the distribution area of advertising information based on distribution area information in said distribution place information and the present position measured by said position measurement means;
- a reception directions means directing reception of said advertising information based on the judgment result of said judgment means;
- an advertising information acquisition means getting an advertising information corresponding to said distribution place information provided by said advertising information management server using said control channel or said traffic channel if said reception directions means directs reception;
- an advertising information memory means memorizing advertising information acquired by said advertising information acquisition means; and
- a display means displaying advertising information memorized in advertising information memory means;

wherein said reception directions means directs reception of said advertising information to said advertising information acquisition means when said judgment means judged the present place is in the distribution area of advertising information, however, does not direct reception to said advertising information acquisition means, even if said radio communication device once comes out and returns within said designated place again and said judgment means judged the present place is in the distribution area when the receive information of said advertising information is memorized in said advertising information memory means, wherein said radio communication device transmits map data request information with read information which means said advertising information was already read to said advertising information management server, if the key corresponding to MAP button is pushed in the state where a display block shows the details of said advertising information and MAP button, and wherein said advertising information arrangement server accesses a map database and transmits map data processed to display the present position of said radio communication device and an advertiser's store most greatly, if said advertising information management server received said map data request information.

57. A radio communication service providing method according to claim 56, further comprising;

a step of a first information transmitting means transmitting information showing that said advertising information is acquired, if said advertising information acquisition means acquires advertising information using said broadcast channel and mutual communication with the side of said radio communications network is performed after acquiring said advertising information.

58. A radio communication service providing method according to claim 56, further comprising;

a step of a second information transmitting means transmitting information showing that said advertising information is acquired, if said display means displays advertising information and mutual communication with the side of said radio communications network is performed after acquiring said advertising information.

* * * * *